April 14, 1959 C. A. HUBERT ET AL 2,881,627
REVERSE CREEPER-DRIVE FOR TRACTORS
Filed May 24, 1956 5 Sheets-Sheet 3
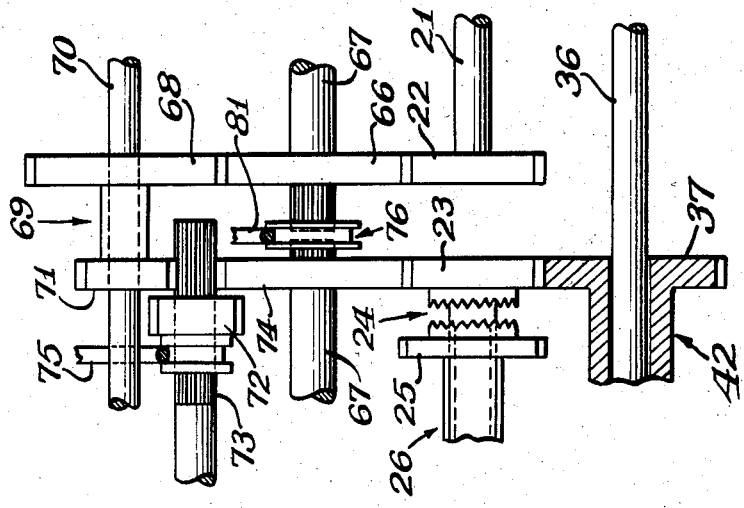
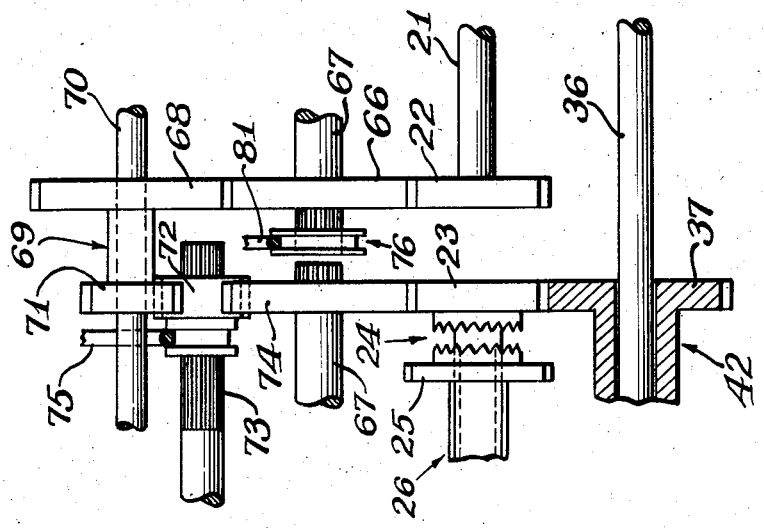
Inventors:
Clarence A. Hubert
William C. Rosenthal
Robert D. Barrett
Paul O. Pippel Atty.

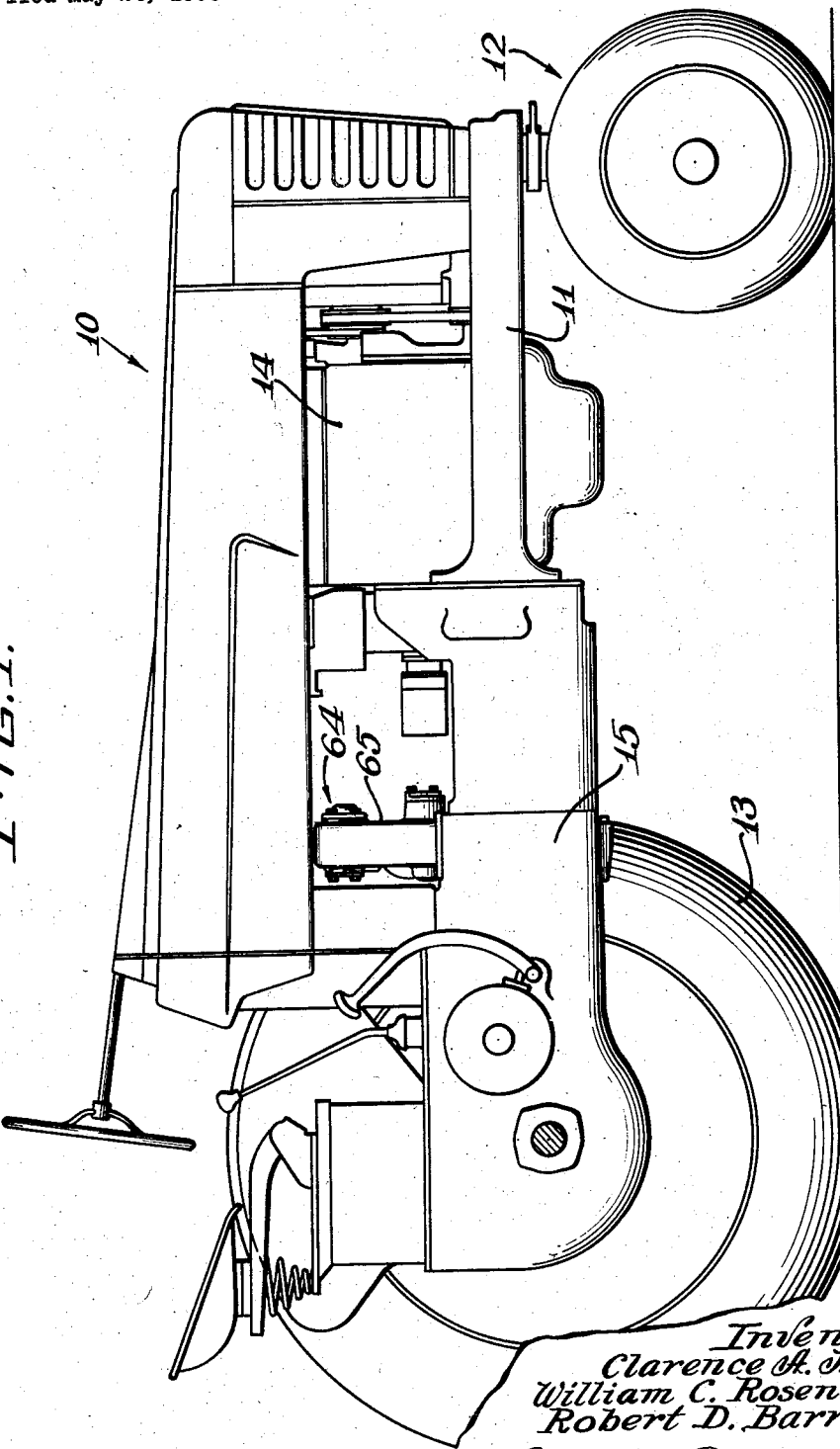

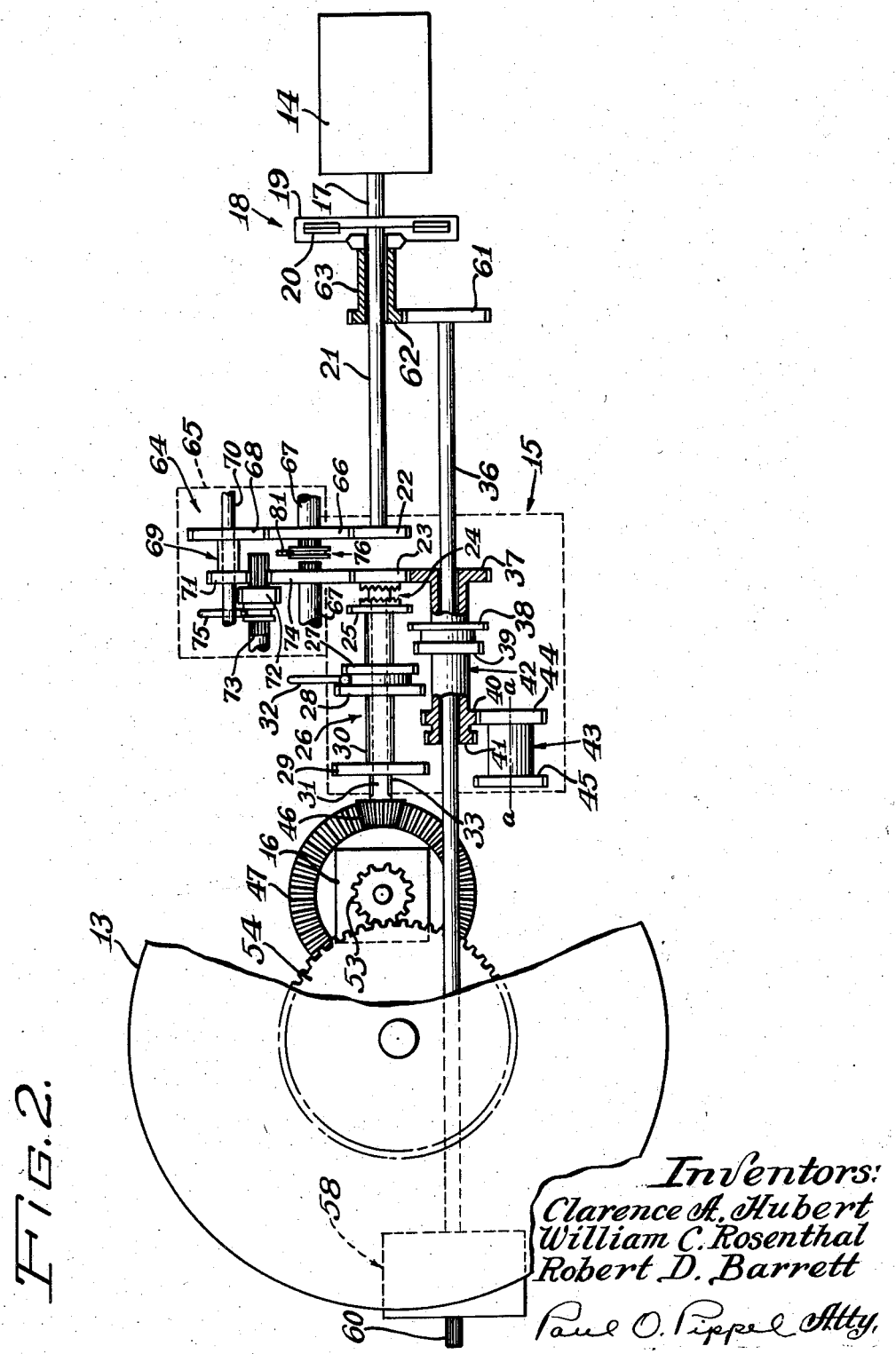

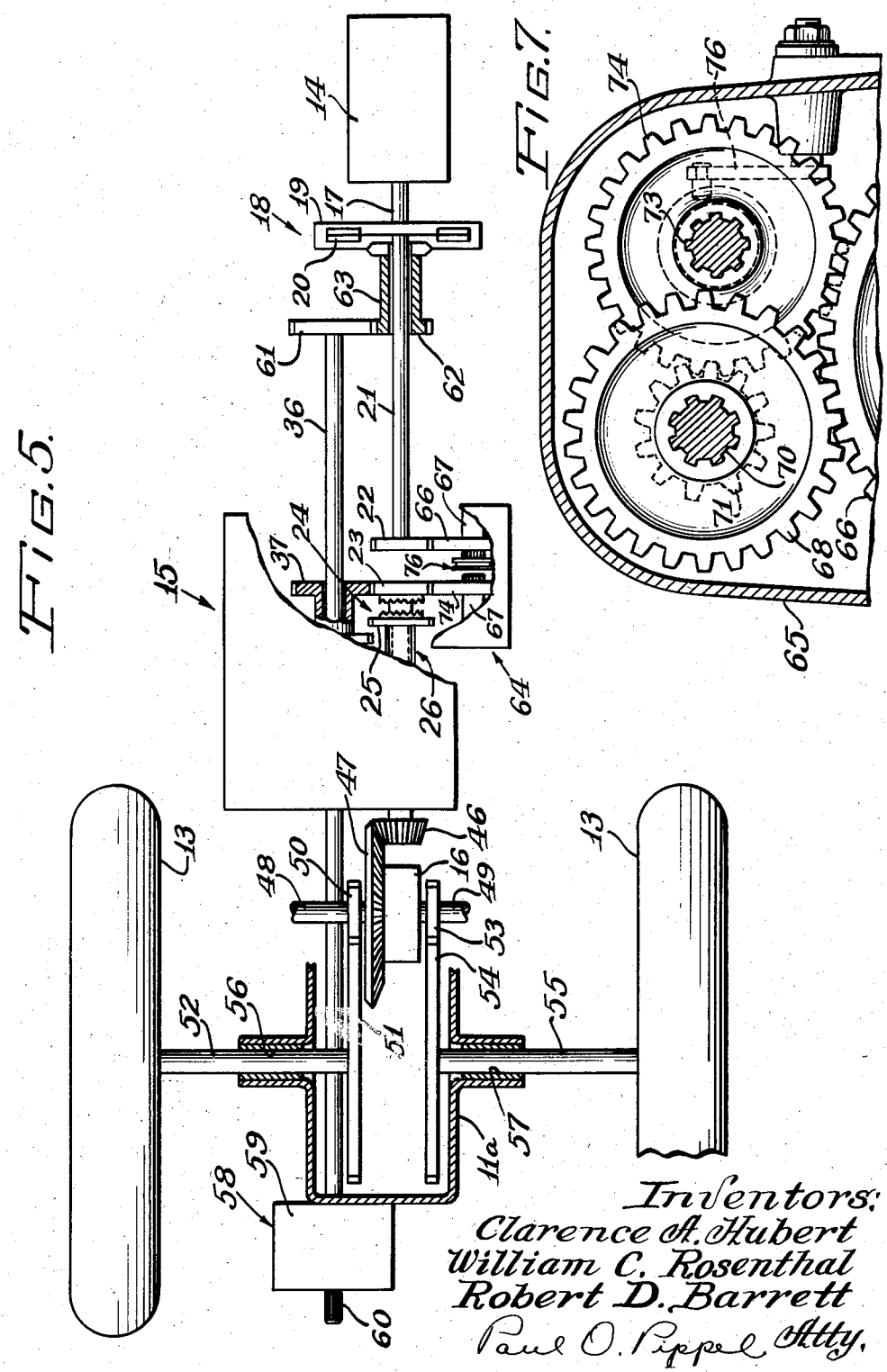

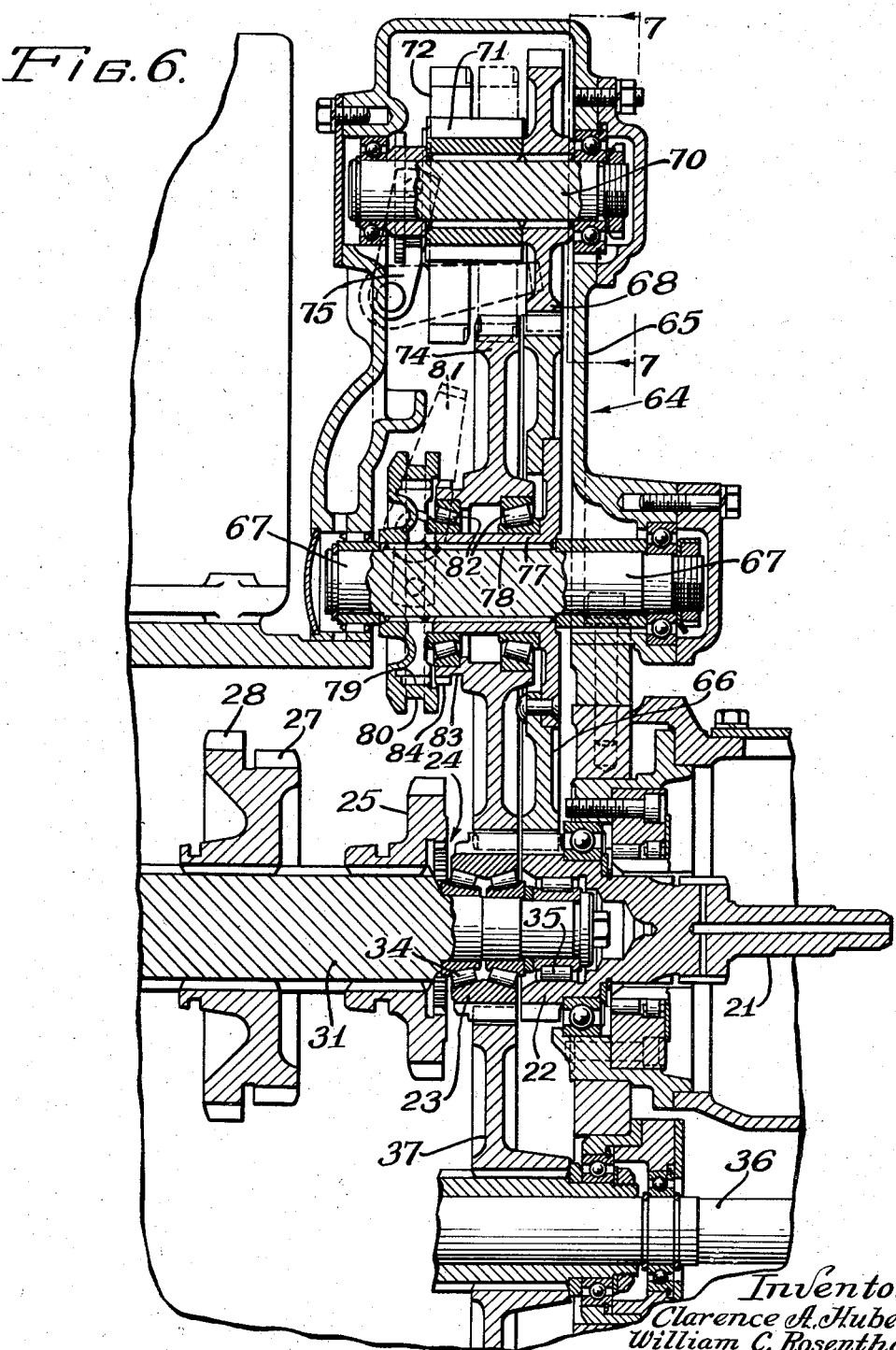

United States Patent Office 2,881,627
Patented Apr. 14, 1959

2,881,627
REVERSE CREEPER-DRIVE FOR TRACTORS

Clarence A. Hubert and William C. Rosenthal, Chicago, and Robert D. Barrett, Westchester, Ill., assignors to International Harvester Company, a corporation of New Jersey Application May 24, 1956, Serial No. 587,042

5 Claims. (Cl. 74—360)

This invention relates to tractors of the wheel type and is specifically directed to an improved and simplified means for providing a reverse-going tractor that, additionally, is operable at creeper speeds.

In some uses of a tractor the machine has mounted thereon certain appliances and equipment, and, incident to this installation, certain modifications may be made therein to permit propelling the tractor in a reverse direction during the use of this mounted equipment, and in a forward direction when not using the equipment, such as when transporting the tractor from one location to another. For instance, when the tractor is intended primarily for use with a mounted cotton picker, or with a mounted thresher, as well as with many other similar applications, it is customary to modify or rearrange some elements of the final drive thereof so as to permit operation of the tractor in the reverse direction but continuing to utilize the conventional change-speed transmission for selecting a number of predetermined speeds in said reverse direction, plus, usually, one speed in a forward direction. In operations of this nature, however, it has been found that even with the modifications that are usually undertaken the speeds obtainable with the conventional change-speed transmission are not entirely satisfactory because operations with such mounted equipment require that the tractor be propelled at extremely slow speeds in a direction reverse to that of normal operation. Speeds in the order of 1.0 m.p.h., in the lowest, and 7.5 m.p.h., in the highest speed ranges of a tractor utilizing a conventional change-speed transmission, are usually desirable for tractor operations of this nature and such speeds are frequently referred to as creeper speeds, while the mechanisms utilized to obtain such speeds are commonly called creeper-speed drives. For the most effective and economical results it is, of course, highly desirable that such drives or mechanisms be incorporated in or added to the conventional tractor in a manner so as not to require substantial modifications therein, and, furthermore, so as not to interfere with the ordinary operation thereof, such as when the tractor might be operated under normal conditions and at conventional speeds.

Although tractors have, heretofore, been equipped with arrangements for propelling the tractor at very low speeds, such devices as have previously been proposed have either been too complicated or too costly to install, or have otherwise not proven entirely satisfactory for driving the tractor at creeper speeds in a reverse direction as well as at conventional speeds in a forward direction.

It is a principal object of this invention, therefore, to provide an improved, inexpensive and simplified creeper-speed drive mechanism which overcomes the objections of previously noted devices and accomplishes the desirable objectives thereof, and which is adaptable for use with tractors employing change-speed transmissions.

Another object is to provide an improved creeper-speed drive for a tractor, which drive is operable through all the speed ranges of the change-speed transmission thereof and which is adaptable thereto without substantial remodeling or rearrangement of the conventional elements of the tractor.

A further object is to provide a creeper-speed drive for a tractor, which is operable through all speed ranges of the standard change-speed transmission thereof, so as to effect a plurality of speeds within each speed range of the tractor's change-speed transmission.

A still further object is to provide a plural speed drive mechanism for a tractor which drive is connectable between the drive shaft of the main clutch and the change-speed transmission thereof whereby each of the speed ratios transmitted thereby is operable through all the speed ranges of said transmissions.

A yet still further object is to provide a creeper-speed drive mechanism wherein the direction of drive transmitted therethrough may be reversed without a change in speed ratio of the power simultaneously transmitted therethrough.

An additional important object is to provide a disconnectable creeper-speed drive mechanism for a tractor wherein said drive is drivingly connectable between the main clutch and the change-speed transmission of the tractor so that said drive is operable through all the speed ranges of said transmission for transmitting drive from the engine to the traction propelling means thereof.

Another important object is to provide a creeper-speed drive for a tractor wherein a creeper-speed is transmitted to the change-speed transmission in a direction reverse to that ordinarily received from the tractor engine thereby permitting the tractor to be propelled in a reverse direction at a creeper speed and which creeper speed is operable through all the speed ranges of said transmission.

Other objects and advantages of the present invention will be understood and will become more apparent from the following description when read in conjunction with the drawings in which:

Figure 1 is a side elevational view of a tractor incorporating the proposed reverse creeper-speed drive therein;

Figure 2 is a diagrammatic elevational view illustrating a traction wheel of a tractor, an engine for such tractor, a change-speed transmission connected with the engine through a disconnectable clutch for driving the tractor in normal operation, together with a reverse creeper-speed drive transmission for transmitting driving force to the traction wheels via the change-speed transmission;

Figure 3 is a diagrammatic view, in enlarged detail, showing the gear train of the creeper-speed drive in creeper-speed operating position;

Figure 4 is similar to Figure 3 but shows the creeper-speed gear train in a direct drive operating relationship;

Figure 5 is a diagrammatic plan view of the components illustrated in Figure 2;

Figure 6 is a vertical sectional view taken longitudinally of the tractor and shows the structural details of the creeper-speed drive mechanism and a portion of the change-speed transmission; and Figure 7 is a partial sectional view, taken on line 7—7 of Figure 6, showing the arrangement of a portion of the creeper-speed gear train.

By referring to the drawings it will be noted that the tractor selected for illustrating a preferred embodiment of the present invention is of generally conventional design. The tractor, which is represented generally by the reference numeral 10, includes a longitudinally extending frame or chassis assembly 11, a steerable front wheel assembly 12, a pair of spaced rear traction wheels 13, a power-plant or driving engine 14, a change-speed transmission unit 15 and a final drive assembly including a differential drive unit 16. Additional structural details included in the drawings have been shown only to illustrate their general relationship, but since such particular details are not entirely essential to a thorough understanding of the concepts of the present invention, they have not been designated with reference numerals because to do so would undoubtedly detract from the clarity of the drawings.

The engine 14 may be any generally conventional power plant suitable for employment for such purposes and it may be mounted by suitable means to the frame or chassis assembly 11. The engine is drivingly connected by a shaft 17 to a main clutch 18 where said shaft is constrained for rotation with a driving element 19 thereof, while a driven disk element 20, of said clutch, is constrained for rotation with a driveshaft 21 that has affixed to the opposite end thereof a gear 22, which latter gear is positioned within the change-speed transmission unit shown generally at 15. The clutch 18 is of the generally conventional spring-loaded variety wherefore the means for controlling the engagement and disengagement thereof is not shown.

Within the change-speed transmission unit 15 the gear 22 may be axially aligned with but spaced from a gear 23 to which is affixed one half of a toothed jaw clutch, indicated in its entirety by the reference numeral 24. The complemental cooperating half of said toothed clutch is disposed on a gear 25 which is fashioned as part of an axially slidable gear cluster, designated by the numeral 26, that additionally includes the axially spaced gears 27, 28 and 29. The cluster 26 is slidably mounted by means of the sleeve or quill shaft 30 on a driven shaft 31 and a shifter fork control lever 32 may be employed for actuating said cluster to affect lengthwise sliding or axial shifting thereof on a splined portion 33 of said driven shaft. The gear 23 is freely mounted for rotation by means of an anti-friction bearing 34 on an unsplined, reduced end portion of the shaft 31, and said shaft, in turn, is journaled by a bearing, such as 35, mounted in a recess in the face of the gear 22. The change-speed transmission unit 15, in addition to the shafts 21 and 31 and the gear cluster 26, comprises a driven shaft 36 extending therethrough, and a plurality of axially spaced gears 37, 38, 39, 40, and 41, arranged in a sleeve-like cluster or quill, designated generally by the reference numeral 42, that is mounted for rotation freely about said latter shaft 36. A reverse idler gear cluster 43, having gears 44 and 45 on opposite ends thereon, is mounted for free rotation on a shaft (not shown) and is arranged for engaging selected gears of the clusters 26 and 42, as will be hereinafter explained.

When the gear clusters 26 and 42, clutch 24, and the reverse idler 43 are in the positions depicted in Figure 2, the transmission unit 15 is in neutral and incapable of transmitting power from the driving shaft 21 to the driven shaft 31. Movement of gear cluster 26 a selected distance forwardly, to the right as viewed in Figure 2, to mesh gear 29 with gear 41, establishes the first or lowest speed power train through said transmission unit. Movement of gear cluster 26 rearwardly, to the left as viewed in Figure 2, to mesh gear 28 with gear 40, establishes the second speed power train, whereas movement of gear cluster 26 forwardly, to mesh gear 27 with gear 39, establishes the third speed power train, and movement of gear cluster 26 rearwardly, to mesh gear 25 with gear 38, establishes the fourth speed train. Movement of gear cluster 26 forwardly, to engage the two opposed complemental portions of the jaw clutch 24, establishes the fifth or highest speed power train through said transmission unit. This latter movement, it will be recognized, establishes a non-speed changing drive wherein there is no speed change through said change-speed transmission unit.

The reverse idler gear cluster 43 is disposed so that gear 44 thereon is in constant mesh with gear 40, which latter gear forms part of the cluster 42, and rotates with said cluster. The axis a—a upon which said idler gear cluster is located, for convenience of illustration, is shown below the shafts 31 and 36 (Figure 2), whereas it is actually disposed at such a position circumferentially of said shafts that the gear 45 thereon is brought into meshing engagement with the driven shaft gear 29 when the gear cluster 26 is shifted a predetermined distance rearwardly, to the left as viewed in Figure 2. When the gear train is thus established power is transmitted from the gear 40, via gears 44 and 45, to the gear 29 for driving the driven shaft 31 in a direction opposite to that to which said latter shaft is ordinarily driven as a result of selected meshing of the respective gears upon the clusters 26 and 42. The various gears upon the drive shaft 21 and driven shafts 31 and 36 may be said to constitute means for driving the driven shaft 31 from the drive shaft 21 at selectively different speeds.

The shaft 31 has a beveled pinon gear 46 fixedly mounted on the rear end thereof which engages and drives a beveled ring gear 47 that, together with the differential drive unit 16, forms a portion of the final drive for the tractor. Coaxial shafts 48 and 49 are differentially driven by the differential unit 16 and a gear 50 constrained for rotation with the shaft 48 meshes with and drives a gear 51 which is fixed to the axle 52, while a gear 53 on the shaft 49 meshes with and drives a gear 54 which is constrained for rotation with the axle 55. The respective axles 52 and 55, are, in turn, journaled in bearing members 56 and 57 which are suitably mounted in a housing 11a that may form part of the rear portion of the frame or chassis 11. It will be readily understood, therefore, that the transmission driven shaft 31 is drivingly connected with the traction wheels or ground-engaging propelling means through the differential drive unit 16 and the axle shafts 52 and 55.

In the embodiment selected for depicting a preferred application of the present invention in a tractor there is provided a rearwardly disposed independent power take-off unit, designated generally by the reference numeral 58, which may be enclosed by a casing or housing 59 that is suitably secured to the chassis housing 11a. The auxiliary shaft 36, which extends into casing 59 and is alternately serviceable as a power take-off shaft drivingly connected with the engine, is suitably coupled to gear members (not shown) disposed within said casing, while a final power take-off splined shaft 60, extending from the rear of said casing, may be equipped with a pulley or any other suitable driving or coupling device, as desired. Said rear power take-off unit is drivingly connected by the shaft 36 and gear 61 to a gear 62 which is constrained for rotation with the driving element 19 of the main clutch 18. In this manner power is transmitted from the engine 14, through the shaft 17 and the driving element 19 of clutch 18, to the meshing gears 61 and 62 and thence to the shaft 36 which, in turn, is coupled to the power take-off unit 58. Since the gear 62 is fixedly secured by a sleeve-like hub or quill 63 to the driving element 19, of main clutch 18, and adapted for rotation therewith, it will be seen that power may be independently transmitted from the engine 14 to the power take-off unit 58 regardless of whether said main clutch is engaged or disengaged, and hence power will always be available at said power take-off unit when the engine 14 is operating.

In accordance with the teachings of the present invention there is now provided an additional gear train, designated generally by the numeral 64, which is drivingly connectable between the engine 14 and the change-speed transmission unit 15 for imparting reverse creeper-speed drive to the traction wheels via the selective speed ratios of said transmission unit. This additional gear train may be disposed within a housing or casing, such as 65, that is suitably mounted on the chassis or frame 11 in the vicinity of the change-speed transmission unit 15. Said gear train includes a gear 66 that is mounted on a shaft 67 and is in constant mesh with gear 22 and a gear 68 that is fashioned as part of a gear cluster 69 which, in turn, is freely mounted for rotation on a shaft 70. An additional gear 71, on the opposite end of cluster 69, is disposed for meshing engagement with a gear 72 that is mounted for slidable axial movement on a splined shaft 73. The gear 72, additionally, is adapted for meshing engagement with a gear 74 and said latter gear is in constant mesh with the gear 23 in the change-speed transmission unit 15. Thus when the gear 72 is moved axially forward, to the right as viewed in Figure 2, to simultaneously mesh with the gears 71 and 74, it establishes a drive through said creeper-speed gear train, whereupon the engine is drivingly connected with the change-speed transmission via the main clutch 18, shaft 21 and successively through gears 22, 66, 68, 71, 72 and 74 to the gear 23, which latter gear may be called the input for said transmission unit. A suitable shifter fork operating lever, such as is illustrated generally at 75, may be employed to slidably move the gear 72 and to slide said gear into and out of engagement with the gears 71 and 74 of said creeper gear train. It will be appreciated from a study of the diagrammatic representations of Figure 2 that, in this arrangement, the direction of rotation of the drive from the engine 14 is reversed between gear 22 and gear 23, thus, when the power received at gear 23 is transmitted through the selectively different speeds of the transmission 15 to the traction wheels 13—13, the tractor will be propelled in a direction reverse to that which normally follows from the power derived through said transmission. This, of course, is particularly useful when the tractor, mounting a cotton picker or a thresher, is operated as a reverse-going machine that requires its motivation in various creeper speeds and in a reverse direction. In the event a non-speed changing drive from the engine, e.g., without any change in speed ratio or direction of rotation thereof, is desired the clutch 76 may be engaged to establish a driving connection directly from gear 66 to gear 74.

The clutch 76 preferably, is of the type commonly referred to as a dental clutch. As illustrated, in the diagrammatic representations of Figs. 2, 3, 4 and 5, it will be noted that the gear 66 is mounted on a shaft designated by the numeral 67, while it appears the gear 74 is mounted on a separate shaft, also designated by the numeral 67, with the dental clutch positioned therebetween. In actual construction however, the structural disposition of the elements is somewhat different, as seen in Fig. 6, since both of said gears are mounted on the same shaft and the dental clutch is not positioned therebetween but is disposed adjoining one of them. The gear 66 is fashioned with an axially extending hub portion 77 and is mounted by the splines 78 on the shaft 67. One half, or one of the complemental jaw portions, of the clutch 76, is also mounted by means of the splines 78 on the shaft 67 and said jaw portion is disposed so as to be axially adjacent the end of the hub 77 of gear 66. This jaw portion is fashioned with an inner ring gear 79 and has an exterior annular groove 80, which groove is fashioned to receive a shifter fork lever 87 by means of which the said jaw portion is moved axially. The gear 74, which is freely mounted by a pair of axially spaced anti-friction bearings 82—82 on the hub 77 of the gear 66, is fashioned with an axially extending hub portion 83 on the exterior of which are disposed the gear teeth 84 that serve as the other complemental jaw portion of the clutch 76. For simplification of terminology the two jaw portions of said clutch may be designated numerically by the reference characters that indicate the teeth thereof, i.e., 79 and 84. Now in order to engage the complemental portions of said clutch the actuating shifter fork 81 is rotated so as to axially move or slide the portion 79 along the splines 78, on the shaft 67, until the teeth of the ring gear therein engage the exterior teeth 84 on the hub portion 83 of the gear 74. In this manner drive is established directly from the gear 66 to the gear 74 without any change in speed or direction of rotation.

As diagrammatically depicted in Figure 2 the tractor is in neutral, and, while power may be transmitted from the engine 14 to the power take-off shaft 60, power will not be transmitted through the creeper drive because neither the gear 72 nor the dental clutch 76 are engaged and disposed for the transmission of power therethrough.

When the tractor is operated under normal forward moving conditions (see Figures 2 and 4) power is transmitted from the engine 14 by way of shaft 17 to the driving element 19, and thence, since the driving and driven elements of clutch 18 are normally in frictional engagement because of the spring-loading thereof, to the shaft 21 and into the change-speed transmission unit 15. The gear 22 which is constrained for rotation with shaft 21, is in constant mesh with the idler gear 66 of the creeper drive and this latter gear is directly connectable by means of the dental clutch 76 with the idler gear 74 which latter gear is in constant mesh with the input gear 23 of the change-speed transmission unit 15. After the desired gear selection has been made, such as by meshing the respective gears of clusters 26 and 42, power is transmitted by way of the pinion and ring gears 46 and 47, respectively, through the differential unit 16 and final drive assembly, to the ground-engaging propelling means or traction wheels 13—13. As heretofore mentioned, power is also independently and simultaneously available at the rear power take-off shaft 60, by virtue of its connection with the quill gear 62 which is constrained for rotation with the driving element 19 of the main clutch 18.

Now, when it is desired to employ the creeper-speed drive, in accordance with the teachings of the present invention, the dental clutch 76 is disengaged, by means of its actuating lever 81, thus interrupting the non-speed changing drive from gear 66 to gear 74, and the slidable gear 72 is axially moved to engagingly mesh with both the gears 71 and 74, thereby completing the power train through said creeper drive. It will be seen that under this condition, as illustrated in Fig. 3, power received from the engine, via shaft 21, is transmitted from the gear 22 successively through gears 66, 68, 71, 72 and 74 to the input gear 23 of the change-speed transmission. The direction of rotation of gear 23, however, is now reversed from that of gear 22 and, of course, is considerably reduced in speed therefrom. Power at this direction and speed of rotation may then be transmitted through any one of the selectively different speeds of the change-speed transmission 15 and, by way of differential unit 16 and the final drive assembly, into the traction wheels which will then operate to propel the tractor in a reverse direction and at the selected creeper speed.

From the foregoing it should now be apparent that the present invention affords a novel arrangement for providing a tractor with a reverse creeper-speed drive, which drive is operable through the conventional change-speed transmission thereof. Although only a preferred form of the invention has been shown and described it will be apparent to those skilled in the art that various modifications may be made therein without departing from the spirit of the invention or from the scope of the appended claims.

What is claimed is:

1. In a tractor having traction propelling means driven from an engine through a disengageable clutch having driving and driven members, and a change-speed transmission having a drive shaft, a driven shaft and a plurality of gear trains of different speed ratios and having the drive shaft thereof operatively connected to the driven member of said clutch and selectively connectable to said driven shaft through said gear trains of different speed ratios and of which the driven shaft is operatively connected with the traction propelling means, the combination of a creeper-speed driving unit comprising, a first gear constrained for rotation with said drive shaft, a second gear, a third gear, said second gear being drivingly connected between said first and third gears, a fourth gear constrained for rotation with said third gear, a fifth gear mounted for axial movement, a sixth gear, a seventh gear freely mounted for rotation on the driven shaft of said change-speed transmission and disposed in continuous meshing engagement with said sixth gear, said fifth gear being slidable axially for drivingly connecting said fourth gear with said sixth gear, a disconnectable driving connecting means engageable to drivingly connect said second gear directly with said sixth gear, said creeper drive being arranged so that when said clutch is engaged and said fifth gear is axially positioned for driving connection with said fourth and sixth gears drive is transmitted from said engine at a reduced speed and in a reverse direction of rotation to any one of the selectable speed ratio gear trains of said transmission, and when said clutch is engaged and said fifth gear is out of driving connection with said fourth and sixth gears and said disconnectable driving means is engaged to drivingly connect said second gear directly with said sixth gear drive is transmitted from said engine without reduction in speed and without change in direction of rotation to any one of the selectable speed ratio gear trains of said transmission.

2. In a tractor, a power plant; traction propelling means driven from said power plant; a disengageable clutch having driving and driven members and being drivingly connectable between said power plant and said traction propelling means; a change-speed transmission having a drive shaft selectively connectable to a driven shaft thereof through gear trains of different speed ratios and of which the driven shaft is operatively connected with the traction propelling means and having the drive shaft operatively connected with the driven member of said clutch; a creeper-speed drive for the traction propelling means, comprising, gear train means drivingly connectable between the drive and driven shafts of said change-speed transmission and including means for reversing the direction of rotation and reducing the speed of the drive transmitted therethrough, whereby when said clutch is engaged said creeper-speed drive is operative to transmit drive from said power plant at a reduced speed and in a reversed direction of rotation to any one of the selectable speed ratio gear trains of said transmission.

3. In a tractor, a power plant; traction propelling means driven from said power plant; a disengageable clutch having driving and driven members and being drivingly connectable between said power plant and said traction propelling means; a change-speed transmission having a drive shaft, a driven shaft and a plurality of gear trains of different speed ratios and having the drive shaft thereof operatively connected to the driven member of said clutch and selectively connectable to a driven shaft through gear trains of different speed ratios and of which the driven shaft is operatively connected with the traction propelling means; a creeper-speed drive, comprising, a first speed-reducing gear train including, a first gear constrained for rotation with said drive shaft, a second gear, and an idler gear drivingly connected for transmitting drive from said first to said second gear, a second speed-reducing and reversing direction of rotation gear train including, a first gear constrained for rotation with said second gear of said first gear train, a second gear, an idler gear, and a third gear freely mounted for rotation on the driven shaft of said change-speed transmission and disposed in continuous meshing engagement with said idler gear of said second gear train, said second gear of second train being slidable axially and drivingly connectable for transmitting drive from said first to said idler gear of said second train, said creeper-speed driving unit further including a disconnectable driving connecting means drivingly connectable between the idler gears of said first and second trains, and having said creeper drive operative when said clutch is engaged for transmitting drive therethrough from said power plant at a reduced speed and in a reverse direction when the slidable second gear of said second gear train is drivingly connected between the first and idler gears of said second train, and alternatively for transmitting drive without a reduction in speed and without reversal of direction when the said disconnectable driving connecting means is drivingly connected between the idler gears of said first and second trains.

4. In a tractor, a power plant; traction propelling means driven from said power plant; a disengageable clutch having driving and driven members and being drivingly connectable between said power plant and said traction propelling means; a change-speed transmission having a drive shaft, a driven shaft and a plurality of gear trains of different speed ratios, and having the drive shaft thereof operatively connected directly to the driven member of said clutch and selectively connectable to said driven shaft through the gear trains of different speed ratios and of which the driven shaft is operatively connected with the traction propelling means; a creeper-speed drive for the traction propelling means, comprising a first gear train including, a first gear constrained for rotation with said drive shaft, a second gear, and an idler gear in continuous meshing engagement with both of said latter gears, a second gear train including, a first gear constrained for rotation with said second gear of said first gear train, a second gear, an idler gear, and a third gear freely mounted for rotation on the driven shaft of said change-speed transmission, said second gear of said second train being slidable axially into a driving connection between said first and said idler gears of said second train, the gears of said first and second trains being selected so as to effect a speed reduction for drive transmitted therethrough, and having said third gear in continuous meshing engagement with the idler of said second train and being selectively connectable to said driven shaft through the gear trains of the different speed ratios in said transmission, whereby said creeper-speed drive is operative for transmitting drive at reduced speed from said power plant to any one of the selectable speed ratio gear trains of said transmission when said clutch is engaged.

5. In a tractor having traction propelling means driven from an engine through a main disengageable clutch having driving and driven members, and a change-speed transmission having a drive shaft, a driven shaft and a plurality of non-reversing direction-of-rotation gear trains of different speed ratios therein and having the drive shaft thereof operatively and directly connected to the driven member of said clutch and selectively connectable to said driven shaft through said gear trains of different speed ratios and of which the driven shaft is operatively connected with the traction propelling means, the combination of a creeper-speed driving unit comprising, a speed-reducing first gear train having at least three gears therein disposed in continuous meshing engagement and having one of said three gears mounted on and constrained for rotation with the drive shaft of said transmission, and a speed-reducing and direction-of-rotation-reversing second gear train including at least four drivingly interconnectable gears therein with means for selectively connecting and disconnecting one of said latter gears between two others of said latter gears and having said second train drivingly connected with said first gear train and selectively connectable through any one of the selectable non-reversing speed ratio gear trains of said transmission to said driven shaft thereof, whereby drive is transmitted at a reduced speed and in a reversed direction-of-rotation from that normally transmitted from said engine to said driven shaft of said transmission when said main clutch is engaged.

References Cited in the file of this patent
UNITED STATES PATENTS

| | | |
|---|---|---|
| 2,485,867 | Dore | Oct. 25, 1949 |
| 2,633,754 | Gerst | Apr. 7, 1953 |
| 2,710,546 | Du Shane et al. | June 14, 1955 |
| 2,772,652 | Du Shane et al. | Dec. 4, 1956 |

FOREIGN PATENTS

| | | |
|---|---|---|
| 243,182 | Switzerland | June 30, 1946 |